US008600145B2

(12) United States Patent
Minin et al.

(10) Patent No.: US 8,600,145 B2
(45) Date of Patent: Dec. 3, 2013

(54) METHOD FOR PROCESSING BANKNOTES (75) Inventors: Petr Valer'evich Minin, Moscow (RU); Vladislav Igorevich Korotenko, Moscow (RU); Dmitry Evgen'evich Sheshukov, Moscow (RU); Dmitry Gennadievich Pis'Menny, Moscow (RU)

(73) Assignee: Obshhestvo S Organichennoj Otvetstvennost'Ju "Konstruktorskoe Bjuro "Dors" (OOO "KB "Dors"), Moscow (RU)

(*) Notice: Subject to any disclaimer, the term of this patent is extended or adjusted under 35 U.S.C. 154(b) by 0 days.

(21) Appl. No.: 13/639,854

(22) PCT Filed: Apr. 7, 2011

(86) PCT No.: PCT/RU2011/000233
§ 371 (c)(1), (2), (4) Date: Oct. 5, 2012

(87) PCT Pub. No.: WO2011/126411
PCT Pub. Date: Oct. 13, 2011

(65) Prior Publication Data
US 2013/0044935 A1 Feb. 21, 2013

(30) Foreign Application Priority Data
Apr. 8, 2010 (RU) .................. 2010113708

(51) Int. Cl.
*G06K 9/00* (2006.01)
(52) U.S. Cl.
USPC ............ 382/135; 382/137; 382/138; 382/140
(58) Field of Classification Search
USPC ................................. 382/135–140
See application file for complete search history.

(56) References Cited

U.S. PATENT DOCUMENTS 6,621,919 B2 * 9/2003 Mennie et al. ................ 382/135
6,721,442 B1 * 4/2004 Mennie et al. ................ 382/135
(Continued)

FOREIGN PATENT DOCUMENTS

| CN | 2499902 Y | 7/2002 |
| DE | 19915440 A1 | 9/2000 |

(Continued)

OTHER PUBLICATIONS

International Search Report with English translation, mailing date Jul. 21, 2011, for corresponding International Application No. PCT/RU2011/000233.

*Primary Examiner* — Wesley Tucker
(74) *Attorney, Agent, or Firm* — Intellectual Property Law Group LLP (57) ABSTRACT

The method may be used in the devices for banknote detecting, counting or sorting; it may be used to determine the banknote main characteristics: its currency type and denomination. The method is based on a computational processing of the banknote digital image formed in the device during scanning. Increase in the banknote processing speed is the technical result. The first variant of the method envisages a preliminary classification and further checking of correspondence to selected possible classes according to several criteria typical for each particular class. For checking of correspondence, an admissibility of the value of interrelation characteristic for two areas is validated. According to the second variant, there is made classification on the base of a banknote digital image and for each possible class the measure of the banknote correspondence to the image is calculated and used for ranking, the banknote is referred to the class closest to it by the measure of correspondence.

6 Claims, 9 Drawing Sheets

(56) References Cited

U.S. PATENT DOCUMENTS

| | | | |
|---|---|---|---|
| 7,631,743 B2 * | 12/2009 | Takai et al. | 194/206 |
| 7,715,613 B2 * | 5/2010 | Dobbs et al. | 382/135 |
| 7,912,272 B2 * | 3/2011 | Joshi et al. | 382/137 |
| 2006/0115139 A1 * | 6/2006 | Joshi et al. | 382/135 |
| 2006/0159329 A1 * | 7/2006 | Joshi et al. | 382/135 |
| 2008/0273789 A1 * | 11/2008 | Bell et al. | 382/137 |
| 2010/0104170 A1 * | 4/2010 | Joshi et al. | 382/135 |
| 2010/0202680 A1 * | 8/2010 | Hamasaki et al. | 382/137 |
| 2012/0008850 A1 * | 1/2012 | Jones et al. | 382/135 |
| 2013/0034291 A1 * | 2/2013 | Minin et al. | 382/137 |

FOREIGN PATENT DOCUMENTS

| | | |
|---|---|---|
| DE | 19928059 A1 | 12/2000 |
| EP | 0809218 B1 | 7/2002 |
| EP | 1138026 B1 | 5/2005 |
| EP | 1901241 A1 | 3/2008 |
| RU | 2305322 C2 | 8/2007 |
| WO | WO 00/46758 A1 | 8/2000 |
| WO | WO 2007/068867 A1 | 6/2007 |

* cited by examiner

METHOD FOR PROCESSING BANKNOTES

CROSS-REFERENCE TO RELATED APPLICATIONS

This application is a U.S. National Phase application, under 35 U.S.C. §371, of International Application no. PCT/RU2011/000233, with an international filing date of Apr. 7, 2011, and claims benefit of Russian Application no. 2010113708 filed on Apr. 8, 2010, and which are hereby incorporated by reference for all purposes.

FIELD OF THE INVENTION

The invention concerns methods to determine banknote main characteristics such as its currency type and denomination. The method may be implemented in the devices for banknote detecting, counting or sorting.

The method under description is based on a computational processing of the banknote digital scan formed in the device during scanning a banknote transported through the device and oriented in a random way. The computational processing of digital scan determines the banknote class which is defined in a unique way by banknote's currency, version, denomination and orientation. Counterfeit banknotes and the other documents for processing which the method is not adjusted are considered not to belong to any class. Basing on the banknote class the device takes a decision about the banknote further transfer and presents the information about this banknote to the user in compliance with the device adjustments and its operation algorithm.

BACKGROUND OF THE INVENTION

The banknote processing device is described, for example, in international application WO 00/46758 (published on Aug. 10, 2000, IPC G07D7/04). The device automatically scans a banknote and obtains its digital scan consisting of two-dimensional images of both sides of the banknote in the visible and infrared bands, and under ultraviolet radiation. The device is equipped with a computing unit for computational processing of the scan.

In compliance with the method used in the given device, characteristics of the banknote being analyzed and the reference one of the specified class are compared. To make this comparison, several square areas are allocated on the banknote two-dimensional digital image, and a set of statistical parameters for each area is calculated. Then the function of state is calculated for each area on the base of the set of statistical parameters; the more similar the given area is with the reference banknote, the higher the function value is. Then the number of areas with the function of state exceeding the specified threshold is counted, and a conclusion about the banknote class is drawn basing on the obtained result. If the number of such areas is higher than a certain minimal quantity, the banknote corresponds to the specified class. Further authenticity verification is carried out by making comparison of the list of areas where specified threshold was exceeded, and a mandatory list of areas.

The main imperfection of the method described in the above-mentioned application is a high computational costs for banknote processing. If a presupposed class of the banknote is unknown, its identification requires comparison of the banknote's digital image with a full set of reference banknotes of the classes to which the banknote being analyzed may correspond. A large amount of calculation is made in a course of comparison with each of the references, and the decision about the banknote membership is taken upon completion of these calculations. A large amount of calculations made for each banknote being analyzed results in high performance requirements applied to computing unit of the device. To ensure the processing speed, the computing unit shall have high performance. If it is low, the banknote processing speed is low.

This method is characterized by a practically linear increase in the performance requirements for the device computing unit with the rise of the number of classes the banknote may belong to. It is due to an independent checking of the banknote correspondence to each possible class. Therefore, to implement the given method, it is difficult to develop a device that would work with a considerable number of currencies of various countries.

The international application WO 2007/068867 (published on Jun. 21, 2007, IPC G07D7/20) discloses the essence of the banknote validation method. In compliance with the above-mentioned method, an automatic validation uses a set of one-class classifiers; each classifier is applied to a set of the features obtained from the banknote image. The classifier of one class is a computational process with an estimate statistical characteristic as its result. Each known class has a criterion of banknote membership in the specific class; the criterion is based on comparison of the values of an estimating statistical value for the given class with a predefined threshold value. In accordance with this method, classifiers for all known classes are applied to the banknote image, and only then their results are analyzed, and a conclusion is drawn about the banknote membership in some class. Drawback of the given method is that the main computational processing i.e. application of classifiers for each banknote is carried out in the same volume, and only then the result is analyzed. Imperfections of this solution are similar to the ones described before and pertinent to the method in application WO 00/46758.

SUMMARY OF INVENTION

The target of the given invention is development of the method for fast processing of the banknotes belonging to a considerable number of possible classes when a computing unit with a middle level performance is used.

The technical result is increase in the banknote processing speed.

This result is achieved due to the banknote processing method in compliance with the first variant when a banknote is scanned to obtain its two-dimensional digital image; a banknote preliminary classification is made to reveal possible classes this banknote may belong to, a sequential checking of the banknote membership in the possible classes is made by a sequential checking of the banknote correspondence to each at least of two membership criteria; if the banknote does not match at least one criterion, a decision is taken to exclude this class from further consideration; the final result is assigned to the first detected class to which the banknote corresponds with all envisaged criteria of checking its membership in the given class; if there is not found any class to which the banknote corresponds according to all checked membership criteria, a decision is taken that the banknote does not belong to any of the possible classes that have been considered.

In one of possible variants of the method implementation if it is found that banknote doesn't belong to any of the discussed classes, an additional preliminary classification is made at least one time followed by checking of the banknote membership in possible classes; moreover, each time there is used a new set of classes the banknote correspondence to which was not checked before, and the final result is assigned to the first detected class to which the banknote corresponds with all envisaged criteria for checking its membership in the given class; if there no class is found to which the banknote corresponds with all membership criteria envisaged for checking, a decision is taken that the banknote does not belong to any of the classes that have been considered.

The claimed technical result is achieved in the second variant of the banknote processing method by scanning a banknote to obtain its two-dimensional digital image, classification is conducted to reveal possible classes to which this banknote may belong to; to do so, the measure of the banknote correspondence to this class is calculated for each revealed class, and the revealed classes are ranked in compliance with the value of measure of correspondence; the class closest to the banknote according to the value of measure of correspondence is selected as the classification result; basing on the classification results the banknote membership in the selected class is confirmed by checking its correspondence to at least one criterion specified for the class which is the classification result; if the banknote does not correspond to the criterion, a conclusion is drawn that the banknote does not belong to this class, if the banknote corresponds to the criterion, a decision is that the banknote belongs to the class which is the classification result; if during the membership confirmation no conclusion is drawn about the banknote membership in any class, a decision is taken that the banknote does not belong to any of the classes that have been considered.

In one of the possible implementation variants according to the second variant of the method if in course of confirmation of the banknote membership in the selected class, a conclusion is drawn that the banknote does not belong to the class that is the classification result, an additional check is carried out of membership in at least one additional class which, according to the ranking results, follows the class closest to the banknote according to the value of the measure of correspondence.

In one of possible implementation variants according to the second variant of the method if in course of banknote classification, correspondence of the banknote to at least one additional criterion specified for each class is checked, and the classes that do not correspond to such a criterion are excluded from further consideration.

In one of possible variants of the method implementation in compliance with any claimed variant, in the course of checking or confirmation of the class membership, the areas in the obtained banknote image are allotted according to the scheme specified for this class; to check at least one criterion of the class membership, for a definite pair of areas the permissibility of interrelation characteristic for this pair of areas is checked, to do so, the interrelation characteristic of the areas is calculated as a function specified for the given pair and depending on the values of pixels in the areas constituting the pair, and it is considered permissible only when the value of the indicated function falls within the specified range.

The classes the membership to which may be checked according to the claimed method will be called known classes. Specifics of device application determine a set of the known classes. If the device is intended only for processing banknotes of one country, its set of known classes shall include all denominations and versions of banknotes of the given country, each in 4 possible orientations. The multicurrency devices shall have an increased set of known classes so that to cover all denominations, versions and orientation of the specified currency set. When implemented in a specific device, the claimed method is adjusted for a definite set of known classes by selecting parameters.

The claimed method detects a banknote membership in one of the known classes, or draws a conclusion that it does not belong to any of the known classes.

According to both variants of the method, the banknote class is defined by a multistage checking of the criteria of correspondence to some class. Contrary to prior art in which the criteria of correspondence are checked after a large amount of preliminary calculations, calculations in the claimed method are divided into a set of simple blocks and are performed sequentially while checking each criterion. Computational costs are cut because checking of the digital image correspondence to the criteria of a definite class stops as soon as the first incompliance with such a criterion is detected. As a rule, for most classes to which the banknote being analyzed doesn't belong to, correspondence checking stops long before checking of a full set of the criteria envisaged for the specific class. So, there is actually made only a small portion of the total amount of calculations required to confirm matching with each known class.

A digital scan of banknote may be formed on the base of various physical principles. The banknote processing devices use sensors to register various physical characteristics of the banknote. Mostly widespread are optical sensors that register the banknote characteristics of emission transmission or reflection for the specific wavelengths in the visible, infrared and ultraviolet bands. Moreover, optical sensors are used to register various types of luminescence. In addition to optical sensors, there are also widespread magnetic ones that register magnetic permeability or residual magnetic induction of banknote. There are also used sensors measuring the banknote electric permeability and its thickness.

Usually sensors register sequences of readings while banknote moves linearly. This process is called banknote scanning. From the point of view of a geometrical reference to the banknote surface, the results of the sensors operation may be represented in a digital scan as linear or two-dimensional arrays. The arrays contain digitized readings of the values registered by the sensors.

The linear arrays describe distribution of some parameter on the banknote surface along the straight bar located on the banknote surface in a certain way. An example of such an array is the array of the values of the signal of a magnetization sensor whose sensitivity area forms a straight bar when moving along a banknote surface.

Two-dimensional arrays describe distribution of some parameter in the rectangle areas located on a banknote surface in the form of rows and columns. An example of a two-dimensional array is the result of a banknote surface optical scanning in the mode of measuring a reflected light level. Rather often a two-dimensional optical component of a banknote digital scan is called the image, and the elements of a two-dimensional array are called pixels. In spite of the fact that in most cases the two-dimensional arrays are formed by optical sensors, there are also known devices that register two-dimensional arrays of residual magnetic induction.

Banknotes may be processed using both linear and two-dimensional arrays, as well as their combination. If only linear arrays are used, the characterization of various banknote classes can't achieve sufficient certainty as the characteristic features of banknotes that belong to some classes may turn out to be beyond the limits of the bars registered by the sensors. That is why devices that register two-dimensional arrays are used in most practical applications that need high quality of processing of banknotes of various classes. To increase certainty of banknote identification and rejection of forgeries, linear arrays are sometimes added to two-dimensional.

The task of the stage of preliminary classification according to the first variant of the invention is to exclude from further consideration the classes to which the banknote obviously doesn't belong to. The stage of preliminary classification is not meant to solve the problem of selection of the only class a banknote belongs to. So, as a rule, that stage is computationally simple. The main amount of calculation is made at the stage of determination of the only class the banknote belongs to. In this case, the number of classes that need checking to be done is much less than the number of known classes. An advantage of the preliminary classification usage is reduction of the number of classes that need a detailed checking of membership in some class. After a preliminary classification is over, the correspondence criteria for each of possible classes is checked. But checking stops as soon as there is detected a class for which checking of criteria completed successfully. If such a class is not detected, a decision is taken that the banknote does not belong to any possible class.

Checking of membership in possible classes made during determination of the only class to which the banknote belongs to simultaneously solves the problem of a counterfeit banknote rejection. The above-mentioned problem is solved by analyzing correspondence to the criteria that check for presence of the banknote security features.

In the claimed method, checking of the criterion of correspondence to the specified class means any computational estimation of information of banknote digital scan which may result either in success or failure. The way the correspondence criterion is formulated shall provide success for images of all banknotes of the specified class, and failure for the images of most banknotes of other classes.

The claimed method for checking membership in the specified class envisages a multiple sequential checking of several different criteria. An unsuccessful result obtained in this sequence for one of the criteria means the banknote does not belong to the specified class. In this case, it is useless to continue checking sequence as a logical conclusion regarding membership in the specified class has already been obtained.

On the contrary, if checking of the envisaged criteria is successful, it means (with a very high degree of confidence) that the banknote belongs to the specified class. Success of each separate criterion individually may not give very high confidence in the banknote membership. But a confident judgment about the banknote membership in the specified class may be made on the grounds of success of all criteria.

To raise the level of confidence about the result, it is necessary to use a large number of criteria, and these criteria themselves shall check different aspects of the banknote properties. It is practically found out that the results are optimal if the sequence and content of criteria follow the banknote checking procedure used by an experienced forensic expert. In this case, it is possible to speak about a comparable level of confidence about the results of checking made by a forensic expert and in accordance with the claimed method.

According to the second variant of the invention, at the beginning of computational processing of the banknote digital scan, a classification stage is envisaged. At this stage similarly to the preliminary classification, there are determined possible classes to which a banknote may belong to. All the classes to which the banknote can not belong are excluded from further consideration. Then, unlike the preliminary classification, possible classes are ranked according to the measure of correspondence of the banknote to each of these classes. The correspondence measure is the number characterizing the banknote degree of closeness to the definite class.

Comparison of the measure of banknote correspondence to the given class with a specified threshold value may be used as a criterion of the banknote membership in the given class.

Classification may rely only on analysis of the calculated values of the banknote measure of correspondence to various classes. For this, after the measure of correspondence to all known classes has been calculated, it is necessary to make comparison with the threshold value known for each class. According to the results of comparison, the classes to which the banknote being analyzed doesn't obviously belong to shall be excluded from further consideration.

The class to which the banknote corresponds to the maximum extent among the remaining classes is determined by ranking the values of the measures of correspondence of the banknote being analyzed to each of possible classes. The class which is closest to the banknote is selected among probable classes.

A classification algorithm is selected so that the total time of banknote processing is reduced. The algorithm enables to indicate the class of a banknote if it belongs to a known class. However, it does not ensure a full depth of checking required for excluding the banknote that does not belong to any class (counterfeited banknotes or the ones that do not belong to the known classes). Therefore, after classification has been made, the banknote membership to the selected class shall be confirmed.

For this purpose, at least one criterion of the banknote correspondence to that class (the classification result) is checked. To increase the depth of checking, several successively checked criteria may be used; each criteria deals with checking presence of some characteristic feature of the banknote. The criterion may particularly be used to check presence of a security feature on the banknote that is very difficult to be forged. Such a criterion makes possible rejection of counterfeit banknotes. A banknote is recognized as a resultant class representative if all the envisaged criteria of its membership in the given class have been checked with success. Even if one checking of the above-mentioned criteria failed, a conclusion is drawn that the banknote does not belong to any of the known classes.

DETAILED DESCRIPTION OF SPECIFIC EMBODIMENTS

The claimed method is implemented for its usage in a banknote counter. The counter mechanism is meant for counting banknotes, i.e. for their piece-by-piece transfer from the hopper (one by one) through the scan sensors zone, and their placement to the stacker. There are installed additional sensors of the mechanism that check presence of banknotes in the stacker and in the hopper, in the banknote transfer path of the counter and check rotation of the mechanism electric drives.

The user interface enables the user to start counting after placing a batch of banknotes into the hopper. As the banknotes from the hopper are transferred to the stacker, the display shows the total number of the counted banknotes by their denominations and the total sum of money. If a banknote of an unknown class is revealed during counting, the counting shall be stopped, and the corresponding message shall appear on the display.

As a rule, the device using the claimed method has a computing unit containing a processor, a read only memory (ROM), a random access memory (RAM), a scan sensors communication interface, a drive control interface, and the user's interface such as display and keyboard.

The scan sensors are arranged as a linear array (line) of the photosensors on one side of the banknote transfer path, and a two-wavelength light source on the opposite side of the path. Emission of the light source is directed through the path to the array of photosensors. The way an array of the photosensors and a two-wavelength light source are made enables them to register light transmission through the banknote along the total width of the path. A photosensor array is equipped with an optical system providing transfer of the banknote surface image to the surface of a photosensor array. A two-wavelength light source alternatively emits either in a visible wavelength band or in an infrared (IR) wavelength band, synchronously with the mechanism rotation. A period of the light source switching corresponds to a 1-millimeter movement of the banknote. So, when the banknote is transferred, the photosensor array registers the banknote transmission both at IR emission and in a visible light after each millimeter of its transfer. The illumination level of the photosensors enables them to operate in a linear mode at the light transmission through the banknote and in a saturation mode at the light transmission through the part of the path without the banknote.

Banknotes may be classified preliminary, for example, by their geometrical size. A banknote size may be easily determined by analysis of its boundaries in a two-dimensional array of the banknote digital image. The algorithms used for this purpose are well-known in the image processing theory. A banknote dimension by its long and short sides enables to select several classes to which the banknote may belong to and reject all others. In this case, the level of selectivity depends on the banknote specific distinctions. For example, if a banknote size is 147×82 mm, it is sure to be a 100-Euro banknote. 4 classes correspond to the above-mentioned banknote size in accordance with 4 possible orientation variants of a 100 Euro banknote at its transfer through the banknote processing device. If a banknote size is 157×69 mm, two denominations are possible: a 1000-ruble note and a 5000-ruble note which in total is 8 classes (taking into account the orientations).

A preliminary classification according to the geometrical size is a computationally simple algorithm. This results in reduction of computational complexity of the banknote processing. As other possible variants of preliminary classification, it is possible to use the method of moment invariants suggested by Hu, the method of symmetrical random patterns and the other fast algorithms of image classification.

Figure 1A:
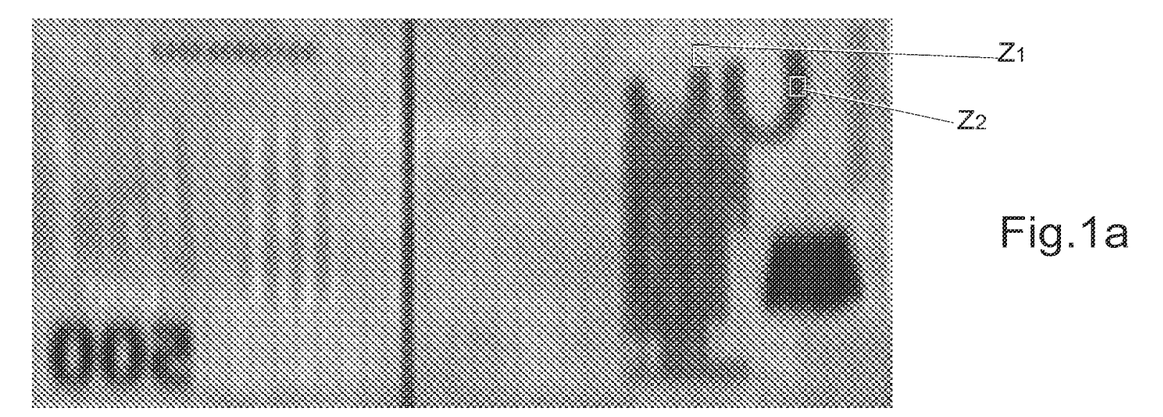
FIG. 1 shows the banknote appearance in a visible and infrared light.
Figure 1B:
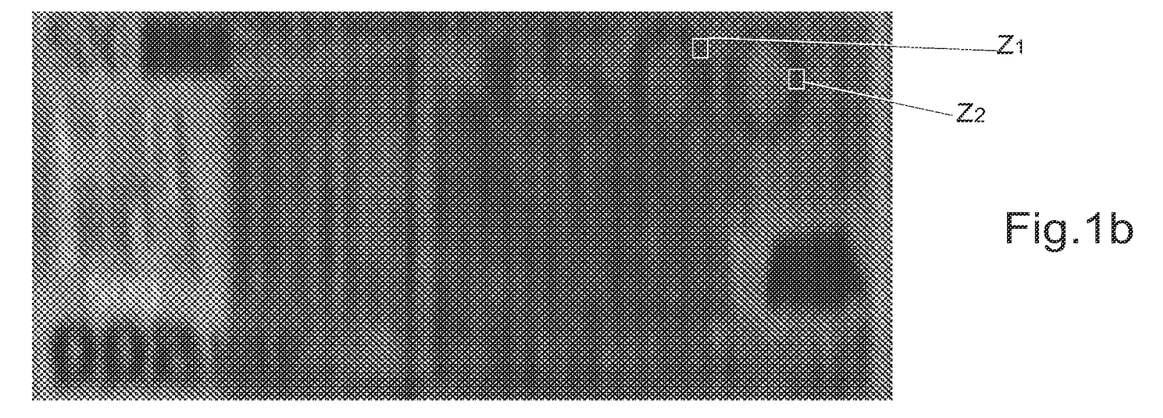

The next step of banknote processing is checking of already selected possible classes for their correspondence to, at least, two membership criteria. An example of the membership criterion is checking of the ratio of average levels of some two parameters in a pair of the specified areas (zones) on a banknote surface. For example, such a criterion is used to check presence of security feature called an infrared mark on the banknote. The infrared mark contains a visually uniform graphic element that is actually printed with two inks. Both inks have the same optical characteristics in a visible light; however, in an infrared radiation one of the inks is fully transparent (IR-transparent) while the other has a significant optical density. An opposite side of the banknote in the infrared mark location is printed with the ink transparent in infrared radiation. FIG. 1 shows a 500 Euro banknote image taken in the transmitted IR radiation (FIG. 1a) and in a transmitted visible red light (FIG. 1b). The given banknote has several infrared marks, the largest one is the inscription "500" which is clearly visible in red light and partially—in IR-radiation. To check this infrared mark, one inspection zone ($Z_1$) is allocated in the same part of the mark that is printed with the IR-transparent ink, and the second—on the other part ($Z_2$) where the ink has a significant optical density in the IR-radiation. Both zones have a high optical density in visible red light. The ratio of average value of the visible light transmission in the first zone to the transmission of the same light in the second zone will be close to 1. If this ratio falls within a specified range of acceptable values, the criterion checking finishes with success. Otherwise, the result of the criterion checking is a failure. Analysis of the collection of original banknotes of the given class that are in circulation is the basis for selection of the acceptable range boundaries. The way they are set shall allow the criterion checking for the specified collection of banknotes to finish with success.

On the other hand, the ratio of an average value of IR transmission in the first zone to transmission of the same radiation in the second zone will be significantly higher than 1. The second criterion may be built on the base of this fact. This criterion requires usage of the corresponding range of acceptable values that ensures success of checking the criterion for collection of original banknotes.

So, the information about the digital image of a pair of zones serves as the basis for formation of two different criteria for the infrared mark checking. Each criterion reflects a separate aspect of the infrared mark checking, that is why success of both criteria results in a high degree of confidence about the banknote authenticity.

It is important that in the above-mentioned example checking of the criterion always results in success for original banknotes of the specified class. For counterfeit banknotes and banknotes of other classes, the most probable result of checking the criterion is a failure, but a successful result is possible in a small number of cases. Failure of checking of at least one of these criteria enables to draw an immediate conclusion that the banknote being analyzed is not a representative of the given class. If both criteria result in a success, the banknote may represent the given class.

The processor software stored in the ROM contains the first module for the banknote transfer control which also communicates with the user by means of the user interface. The first software module deals with monitoring of the state of the banknote movement sensors, and controls the electric drives of the mechanism.

The second software module also allocated in the ROM deals with banknote scanning and all subsequent steps in classification. The program in this module gets started by command from the first module after the next banknote is fed along the path in the direction of scan sensors zone. The program in the second module is completed after the banknote has passed through the scanning sensors zone; the program issues the first module information about the class the banknote was referred to. This information enables the first module to take a decision whether to continue counting or to stop the mechanism.

Just after the program starts, the second module begins scanning of the banknote passing through the scanning sensors zone. While the banknote is moving 1 mm along the path, the program reads out twice the digitized values of the photosensor array signals—one time for the IR transmission, and a second time—for a visible light transmission. These digitized values are written in two corresponding arrays of the processor RAM. Scanning completes as soon as the program determines that all the photosensors of the array have saturated. As a result of scanning, the banknote digital image is written in the RAM; this image contains one two-dimensional array for the IR-emission transmission and the other two-dimensional array for a visible light transmission.

Figure 2:
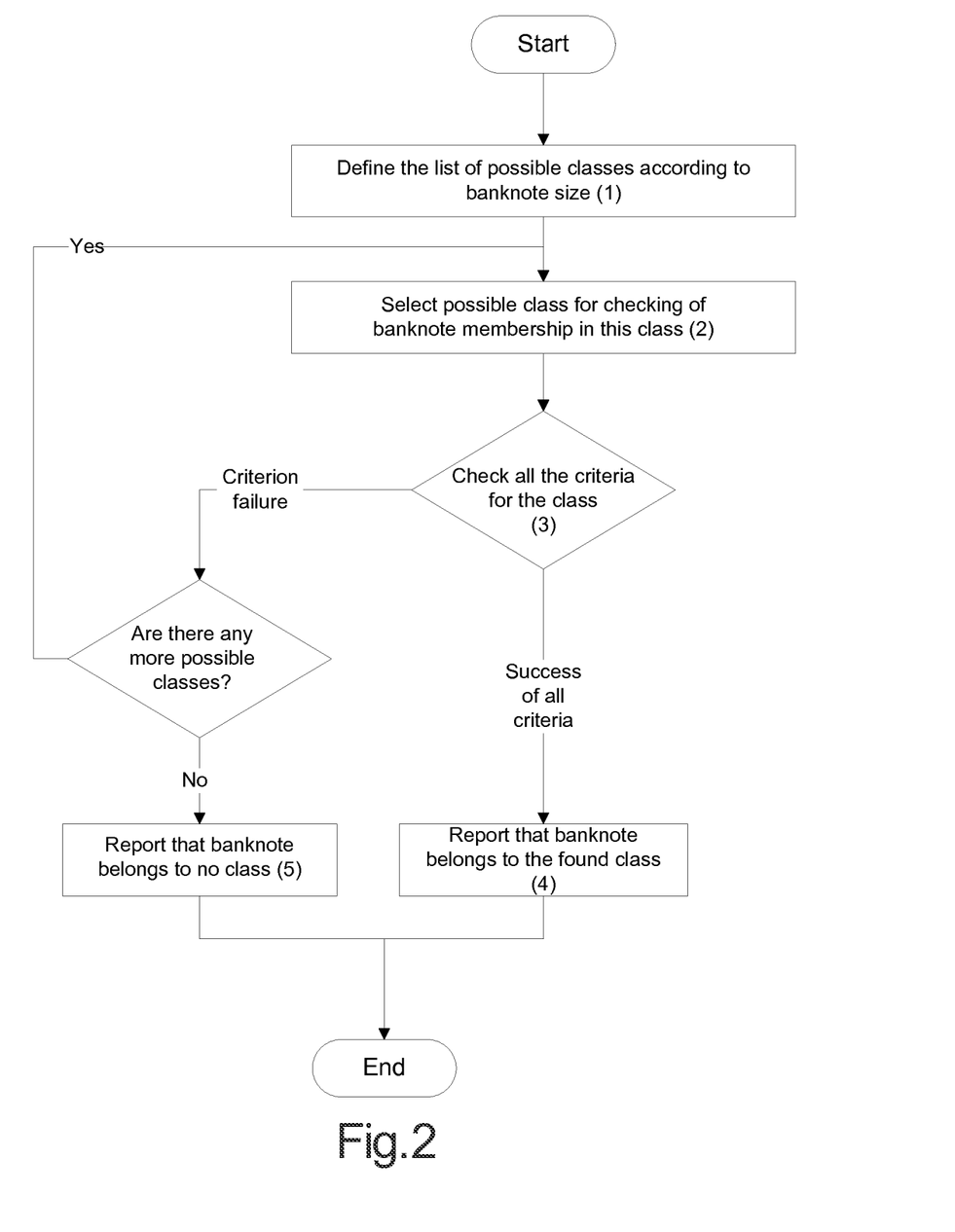
FIG. 2 shows the algorithm of the method implementation according to variant 1.

After scanning is over, the program starts computational processing of the banknote image. FIG. 2 shows the algorithm according to the first variant of the method.

Preliminary classification (1) is the first step to be made. The program determines overall dimensions of the banknote (the dimension of each side) and location of its center in the digital image using the algorithm for finding the boundaries. The banknote boundaries are determined according to transition of a digitized signal of the sensor registered in the visible band from the value corresponding to the saturation state and the one corresponding to the linear mode. The processor ROM stores a table of correspondence of the banknote sizes, on the one hand, and possible classes on the other.

For each possible class the program successively selects a class for checking (2), and then checks the sequences of criteria of the banknote membership in the given class (3).

Figure 3:
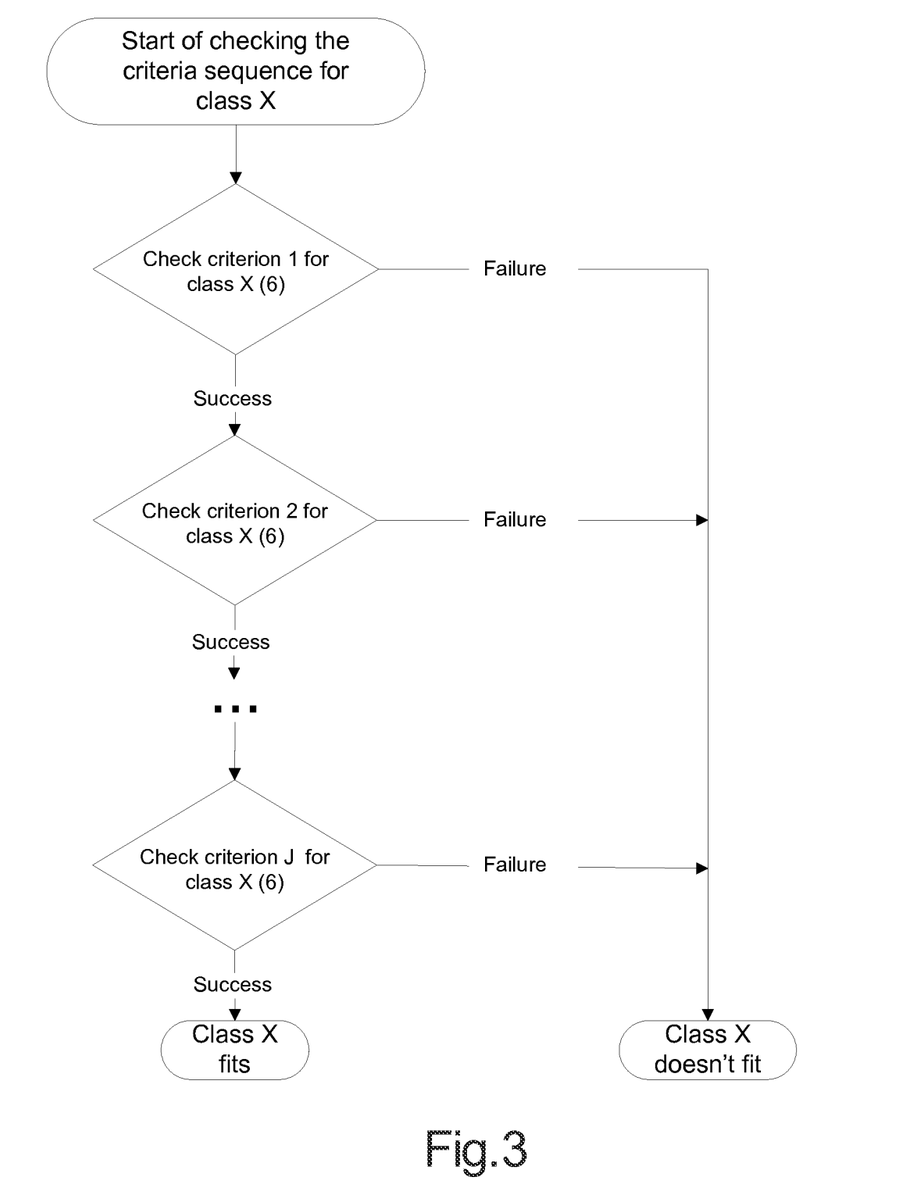
FIG. 3 shows the algorithm of the criteria checking sequence.

FIG. 3 shows checking of the criteria sequence. All criteria are checked uniformly (6). For each criterion the coordinates of the first ($Z_1$) rectangular inspection zone and the second ($Z_2$) rectangular inspection zone are specified as well as the sizes of both zones. The coordinates of the zones are specified with reference to the banknote center. Besides this, for the first zone and for the second zone a two-dimensional data array is specified which is used for zone processing, this is either array of IR transmission or array of the visible light transmission. The program calculates an arithmetic mean value of the array elements located respectively in the first zone and in the second one. Then the program calculates the ratio of the arithmetic mean value of the first zone to the arithmetic mean value of the second one. The obtained ratio is compared with an acceptable range of the values that is specified for the given criterion. If the ratio is within the range, checking is successfully completed. If the ratio is beyond the range, checking completes with a failure.

As soon as an unsuccessful result is obtained in the sequence of checking the criteria (6) for this class, further checking of this sequence stops, and it is necessary to proceed with the sequence (2) for the next possible class. If this sequence of checking the criteria (3) envisaged for the given class is completed with all successful separate checking results, checking stops, and a decision is taken about the banknote belonging to the given class (4).

If all possible classes passed all kinds of checking and each had a failure result, checking also stops. In this case, a decision is taken that the banknote does not belong to any of the known classes (5).

After checking is completed, its results and the program control are returned to the first software module. This module performs actions according to the checking results.

In some cases, it is worth break preliminary classification down to several stages; at each stage a banknote is classified by a possible membership in the subset of the known classes. According to the preliminary classification results, membership in the found possible classes is checked. If the class the banknote belongs to is not found, the next stage of preliminary classification is performed for the second subset of the known classes which was not considered before. Then there is checked membership in the found possible classes from the second subset. The process is repeated till either the class the banknote belongs to is found or till consideration of all known classes is complete. If the class the banknote belongs to is not found, a conclusion is drawn that the banknote does not belong to any of the known classes.

Such implementation permits making the preliminary classification more accurate due to the classification method used at each stage which is optimal for a specific subset of the known classes. For example, a preliminary size classification is very effective for the Euro banknotes as each Euro denomination has a unique combination of its banknote length and width. The stage of preliminary classification for the Euro shall base on the size check. As for the US dollars, a preliminary size classification is completely ineffective as all banknotes of this currency are of the same size (independently from their denomination and version). Therefore, the algorithm for the stage of preliminary classification for the US dollars shall be different from the algorithm for the Euro banknote. For example, a random patterns algorithm may be used.

Classification by the second variant is based on calculation of the measure of banknote correspondence to the specified class. There may be various implementation variants for calculation of the measure of correspondence (or estimation of the degree of closeness). According to one possible implementation, a class is represented by the most typical class member banknote. The most typical banknote is selected as a result of analysis of the digital images of a large number of banknotes in circulation belonging to the given class. To estimate the measure of correspondence, there is calculated an element-by-element correlation coefficient for arrays of the image of the banknote being analyzed and the image of the most characteristic banknote. The more similar these banknotes are, the higher is the correlation coefficient. For two identical images the correlation coefficient reaches the maximum value equal to 1. For a banknote relating to the given class, the correlation coefficient will be just slightly less than 1. On the contrary, the more different the banknotes are, the less is the coefficient of their correlation. For banknotes relating to another class, the correlation coefficient will be significantly less than 1. So, it is convenient to use the correlation coefficient as the measure of correspondence. In the above-mentioned implementation variant a higher degree of closeness to the class corresponds to a higher measure of correspondence.

Other implementation uses the feature extraction method known in the image recognition theory. A banknote digital image is characterized by a definite number of numerical characteristics called features. Each feature is calculated on the base of the digital image data, by a specified algorithm. As features, it is possible to use various known characteristics of the image (for two-dimensional arrays) or sequences (for linear arrays), such as statistical moments, Fourier transform coefficients, average values for the specified areas and the wavelet coefficients.

So, each banknote image is presented by a point in n-dimensional feature space whose coordinates are the values of the corresponding features. The degree of closeness of two banknotes may be estimated by the distance between the points corresponding to them. The distance is traditionally calculated as the root of the sum of squares of difference of the corresponding coordinates of the points. Such a distance is usually called the Euclidean distance. In practice there are also used other distance calculation methods. For example, the so-called Manhattan distance is calculated as a sum of the modules of differences of the corresponding coordinates of points. Computational cost for finding the Manhattan distance is much lower than the cost for finding the Euclidean distance. As a closeness characteristic, the Manhattan distance performs not worse than the Euclidean distance.

Any suitable methods of feature extracting and finding the distance between two banknote images in the feature space could be used for implementation of described variant of the calculation measure of correspondence. The distance in the feature space between the banknote being analyzed and the banknote which is the most typical for the class is used as a measure of correspondence to the class. The lower is the correspondence measure; the higher is degree of the banknote correspondence to the given class.

The choice of the features shall, most efficiently help to characterize the mutual differences in banknotes of all known classes. According to the terminology accepted in the image recognition theory, selection of the features shall ensure a reliable discrimination of classes. According to the practical experience, it is always possible.

To find the resulting class of classification, the classes are ranked by the value of the measure of banknote correspondence to them. The class which is the closest to the banknote by the value of the measure of correspondence is selected as the classification result. In case the measure of correspondence is based on the correlation coefficient, it will be the class with the maximum value of the measure of correspondence. In case the measure of correspondence is based on the distance in the feature space, it is necessary to select a class with a minimum value of the measure of correspondence. The selected class is the classification result.

Comparison of the measure of correspondence to the specified class with a preliminary specified threshold may be used as an additional criterion of banknote membership in the specified class. The classes not corresponding to the criterion of comparison of the measure of correspondence with a specified threshold are excluded from further consideration. Excluding of such classes from ranking is preferable as it reduces the computational costs of ranking.

In case of the correspondence measure based on correlation coefficient we may set such a threshold value that it is possible to speak with assurance that all the banknotes whose measure of correspondence is less than the threshold value do not belong to the given class. If the measure of correspondence exceeds the threshold value or is equal to it, the banknote may belong to the given class.

Respectively in case of the measure of correspondence based on the distance in the feature space, it is possible to set such a threshold value that it is possible to speak with assurance that all banknotes whose measure of correspondence is greater than the threshold value do not belong to the given class. If the measure of correspondence is less than the threshold value or equal to it, the banknote may belong to the given class. The threshold value shall be selected on the base of analysis of the values of the measure of correspondence to the given class for a large collection of banknotes of the given class that are in circulation. The threshold shall be selected with a definite margin defined empirically to ensure correctness of the criterion for banknotes of the given class that are not included in the analyzed set.

Figure 4:
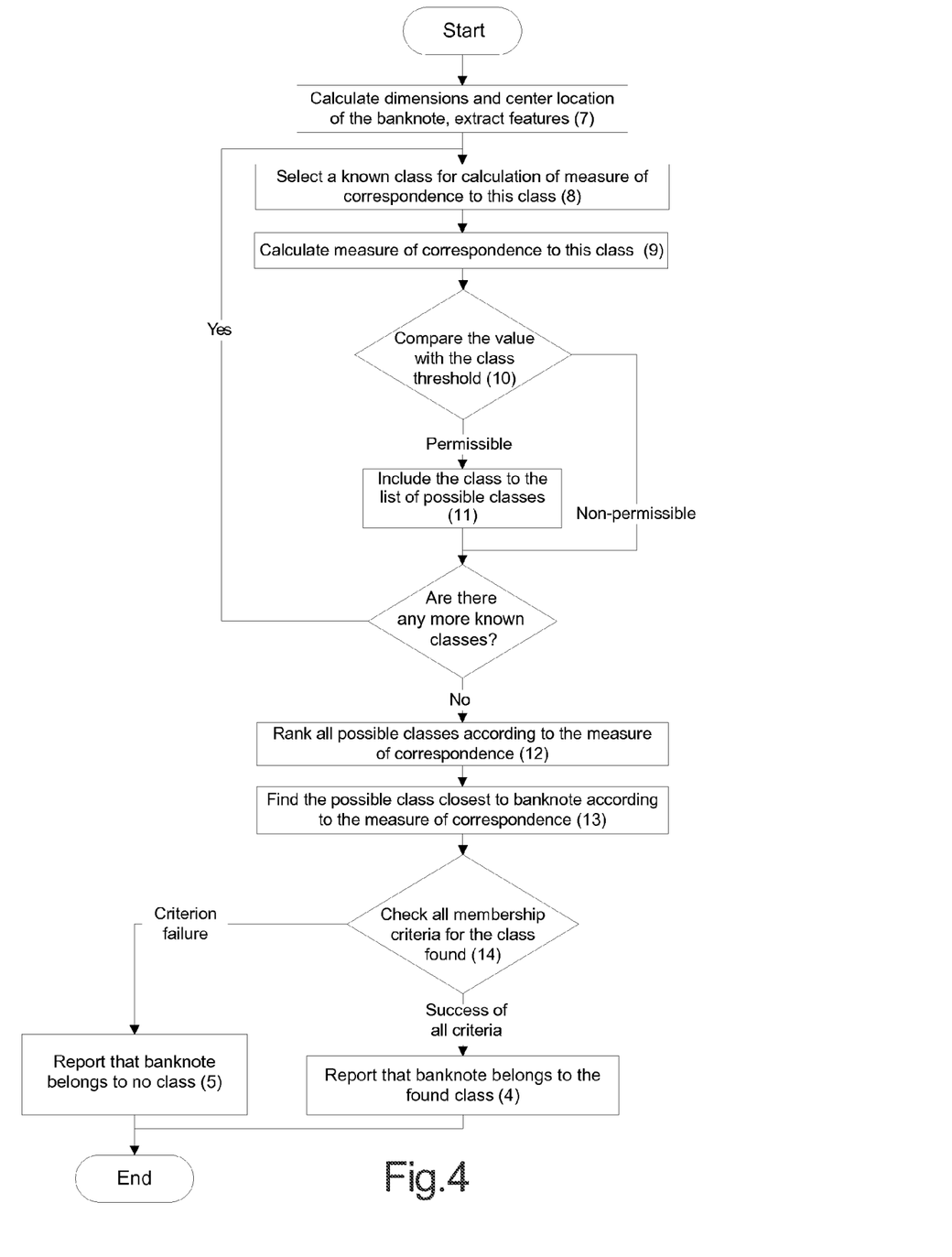
FIG. 4 shows the algorithm of the method implementation according to variant 2.

Computational processing according to the second variant of the method is carried out according to the sequence is shown in FIG. 4, beginning with the banknote classification. First of all, preliminary data processing (7) is carried out. At this step, the banknote overall dimensions and its center are determined similarly to how it was done for the first variant. Beside this, a histogram of array of the IR-data of the banknote digital image is built, and there are determined (by the histogram) lower Hb and upper Ht boundaries between which the banknote transmission range is. During analysis of the histogram, there are rejected the values corresponding to the saturation state of the sensors and the banknote marginal areas.

Figure 5:
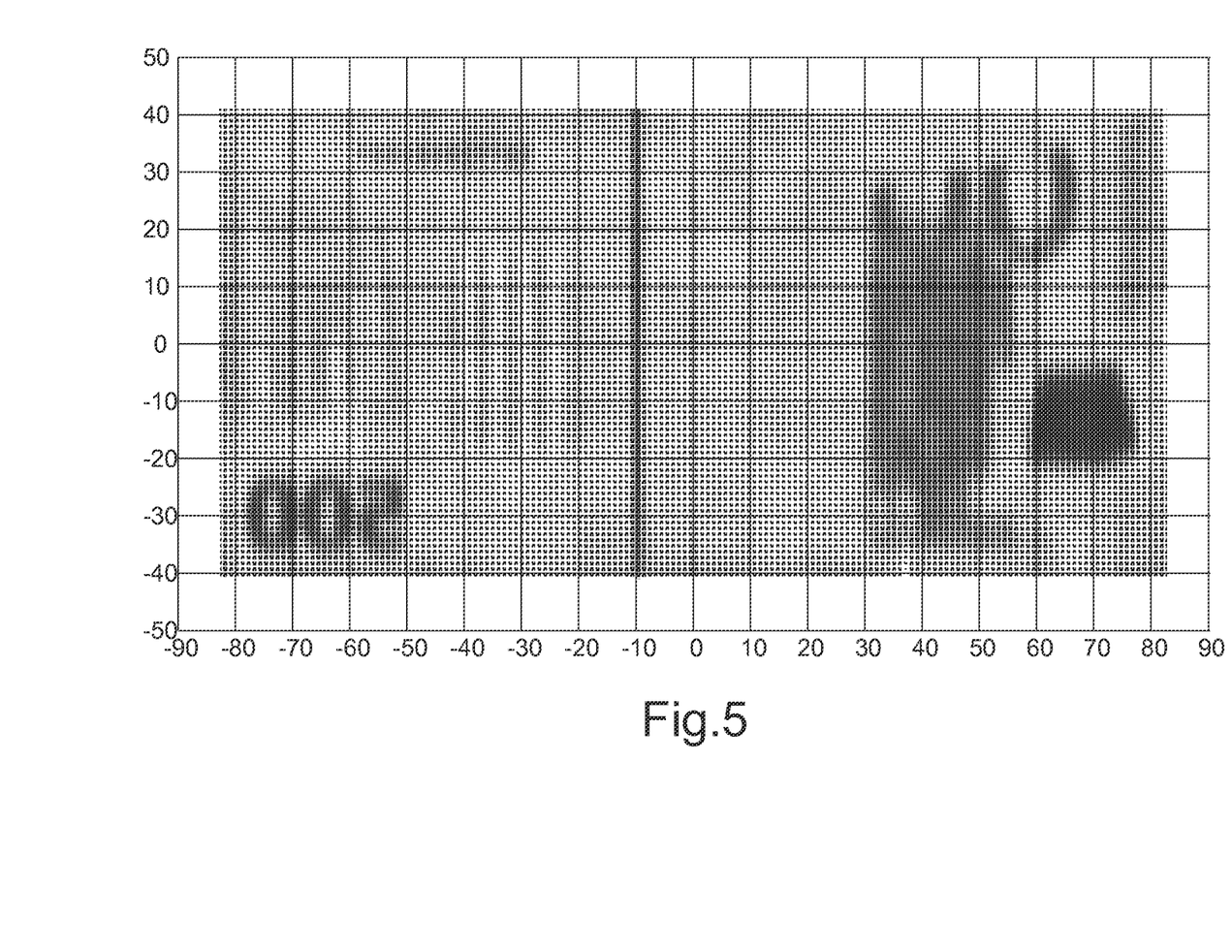
FIG. 5 shows a scheme of banknote separation into zones.

Then feature extraction starts: the banknote image is separated into equal square zones (10×10 millimeters each) that are arranged in rows and columns (FIG. 5). Each such zone in the data array of the digital image corresponds to a square matrix of 10×10 pixels. A new two-dimensional array of features is built where each element corresponds to one square zone, and the value of this element is equal to the arithmetic average value for the elements of two-dimensional array of the IR-data of the digital image that fall within this zone. Each feature array element corresponds to the matrix 10×10 elements of IR-data array. The center of the array is referenced to the banknote geometrical center.

Corrections are made to the obtained feature array in such a way that its values should get within the range 0 to the maximum value Imax. To reach this, there is made a linear transformation of the initial values of features [Hb,Ht] to a new range of the values of features from 0 to Imax, according to the formula:

$$Iout = (Iin - Hb)\frac{Imax}{Ht - Hb}$$

where Iin is the feature value before transformation, Iout is the feature value after transformation. This transformation is applied to all elements of the feature array. The correction is supposed to reduce the difference in features between banknotes of one class that have a different wear degree.

Figure 6:
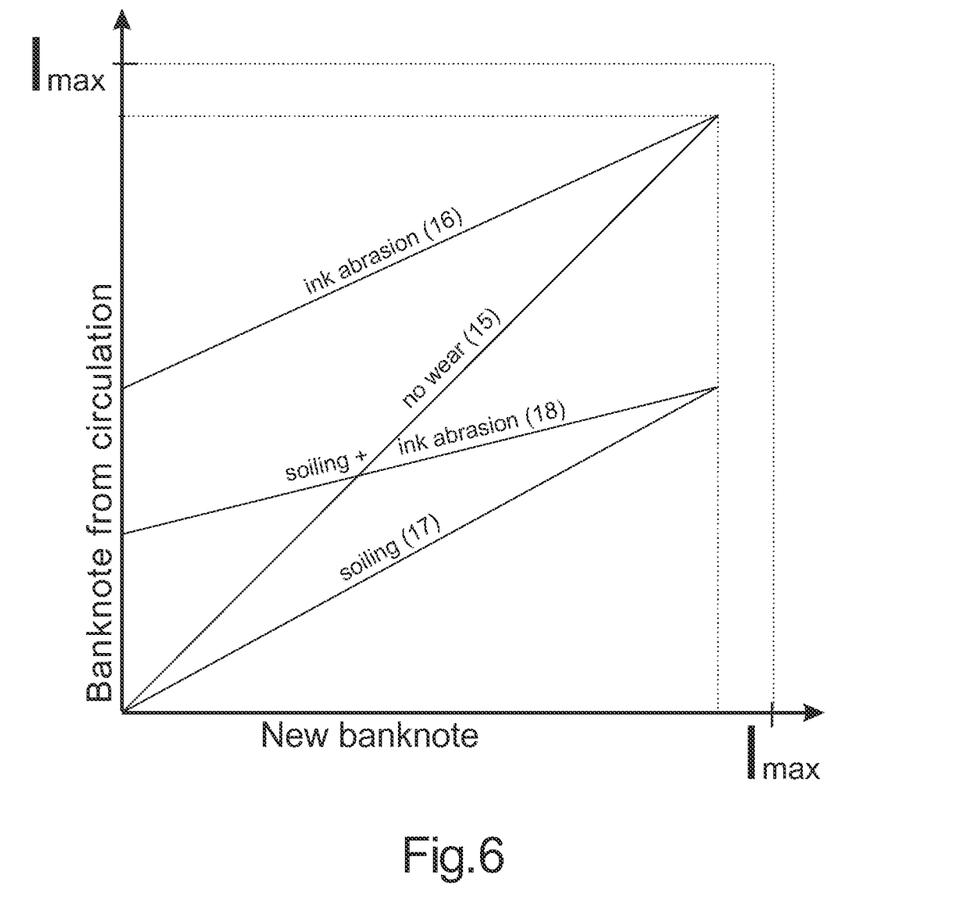
FIG. 6 shows the curves of a linear model of banknote wear.

At first approximation, banknote wear is illustrated by a linear model of banknote wear as demonstrated by the curves in FIG. 6. It is known that banknote wear due to soiling results in reduction of the total transmission of radiation by the paper. Moreover, abrasion of the ink layer results in reduction of the total banknote contrast. Curves 15-18 (FIG. 6) demonstrate changing of the values of optical density in various areas of absolutely new banknote (the abscissa axis) in relation to the optical density values in the same areas after the banknote wear (the axis of ordinates). Straight line 15 corresponds to practically unworn banknote, straight line 16—to a banknote with an abraded ink layer, straight line 17—to a banknote with a uniform soiling, straight line 18—to a soiled banknote with an abraded ink layer. The given model does not take into account nonlinear distortion of the optical density range. However as experience proves, with given model it is possible to reduce significantly the difference in features for banknotes of one class having different wear grade.

Figure 7A:
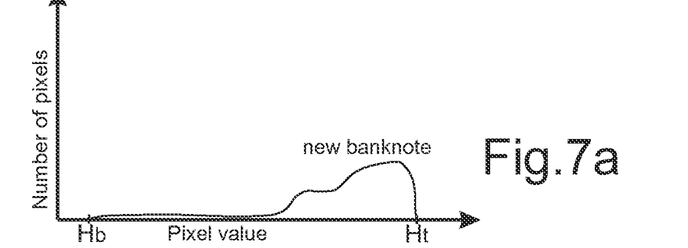
FIG. 7 shows the banknote histograms during a mathematical transformation.
Figure 7B:
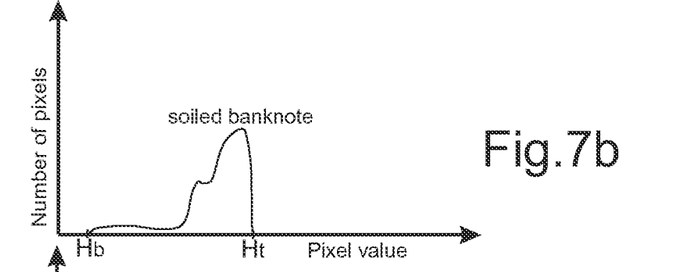
Figure 7C:
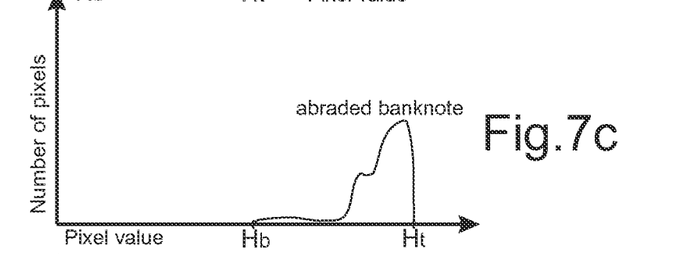
Figure 7D:
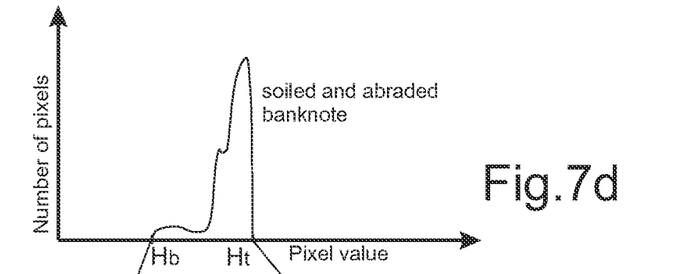
Figure 7E:
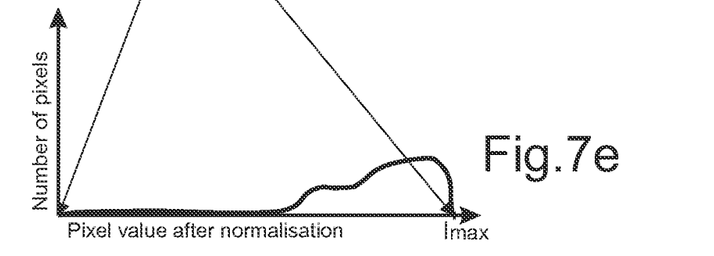

In compliance with the linear model, wear leads to change of the banknote histogram (FIG. 7a-7d). FIG. 7a demonstrates the histogram of an unworn banknote. Wear may be characterized by a range of values Ht and Hb between which a range of the banknote transmission values is located. Banknote soiling (FIG. 7b) leads to contraction of this range, and shifts it down while the banknote abrasion (FIG. 7c) leads to contraction of this range and shifting it up. A combination of abrading and soiling even more reduces the range of gradations and shifts it down (FIG. 7d). Linear transformation of the range [Hb,Ht] to the range [0, Imax] leads to reduction of various histograms of banknotes of one class (FIG. 7a-d) to a practically identical appearance (FIG. 7e), irrespectively of the grade of wear. After such a transformation, the feature difference between banknotes of one class having different grade of wear becomes small. The responsibility for these small residue differences is attributed to nonlinear changes of the optical density of worn banknotes and their local wear as well. Such effects are not taken into account by a linear model of wear, neither they create any essential obstacle at classification.

So, the above-mentioned linear transformation enables to reduce the difference between transmission levels of various banknotes of the same class. The elements of a feature array are actually the banknote transmission levels averaged along a 10 mm by 10 mm square, respectively, this linear transformation reduces the difference between features of various banknotes of the same class.

All feature array elements are treated as banknote coordinates in the feature space. The ROM stores the feature arrays of the most typical banknote for each known class calculated beforehand. The distance between banknotes in the feature space is defined according to the Manhattan distance formula. The feature array of the most typical banknote is preliminary calculated on the base of analysis of a large collection of banknotes in circulation belonging to the same class. A banknote with the least value of the maximum distance to all other banknotes in the collection is selected as the most typical among this collection. Such a selection criterion ensures finding of the most typical banknote in the middle of a cloud of points corresponding to separate banknotes of this collection.

As a measure of correspondence to the class, the Manhattan distance between the banknote being analyzed and the most typical banknote of the given class is used. A known class is selected (step 8, FIG. 4) and the value of the measure of correspondence is calculated (9). If the measure of banknote correspondence to the selected class does not exceed the threshold set for each class, this class is included in the list of possible classes (10, 11). Operations 8-11 are repeated for all known classes. Possible classes that have been found are further ranked according to the value of the measure of correspondence of the scanned banknote to these classes (12). A possible class with a minimal measure of value (13) is selected as the classification result.

Then the banknote membership in the selected class (14) is confirmed by a successive check of correspondence of the banknote to the criteria of membership for the class which is the result of classification. The criteria are determined similarly to variant 1, and they are checked in the same way (FIG. 3). If all the criteria envisaged for the given class have been checked successfully, a conclusion is drawn that the banknote is a member of the class being the result of classification. If there was revealed a criterion to which the banknote does not correspond, a conclusion is drawn that the banknote does not belong to any of the known classes.

After checking is completed, its results and the program control are returned to the first software module. This module performs actions in compliance with the results of checking.

Figure 8A:
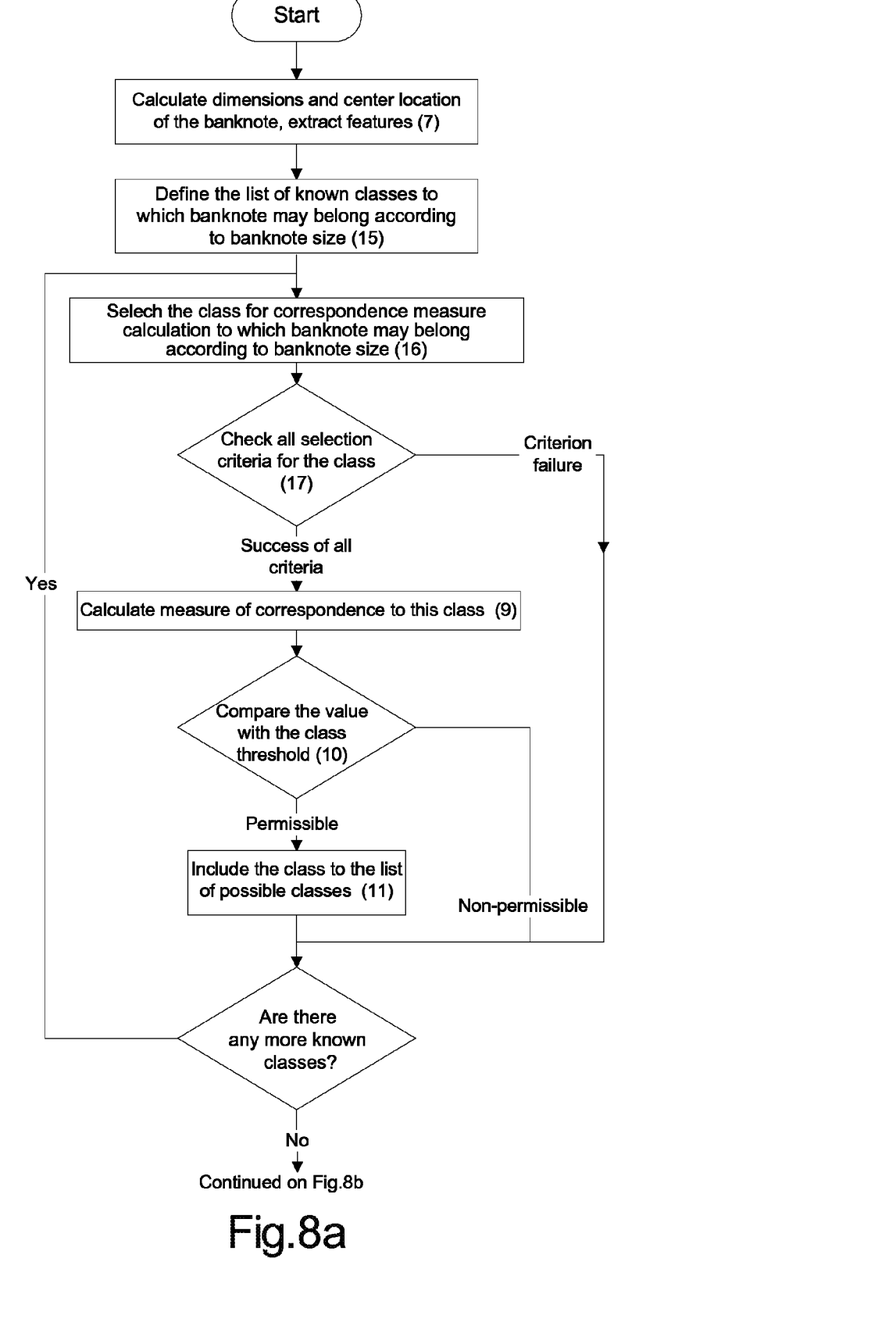
FIG. 8 shows the algorithm of a possible implementation of the method by variant 2.
Figure 8B:
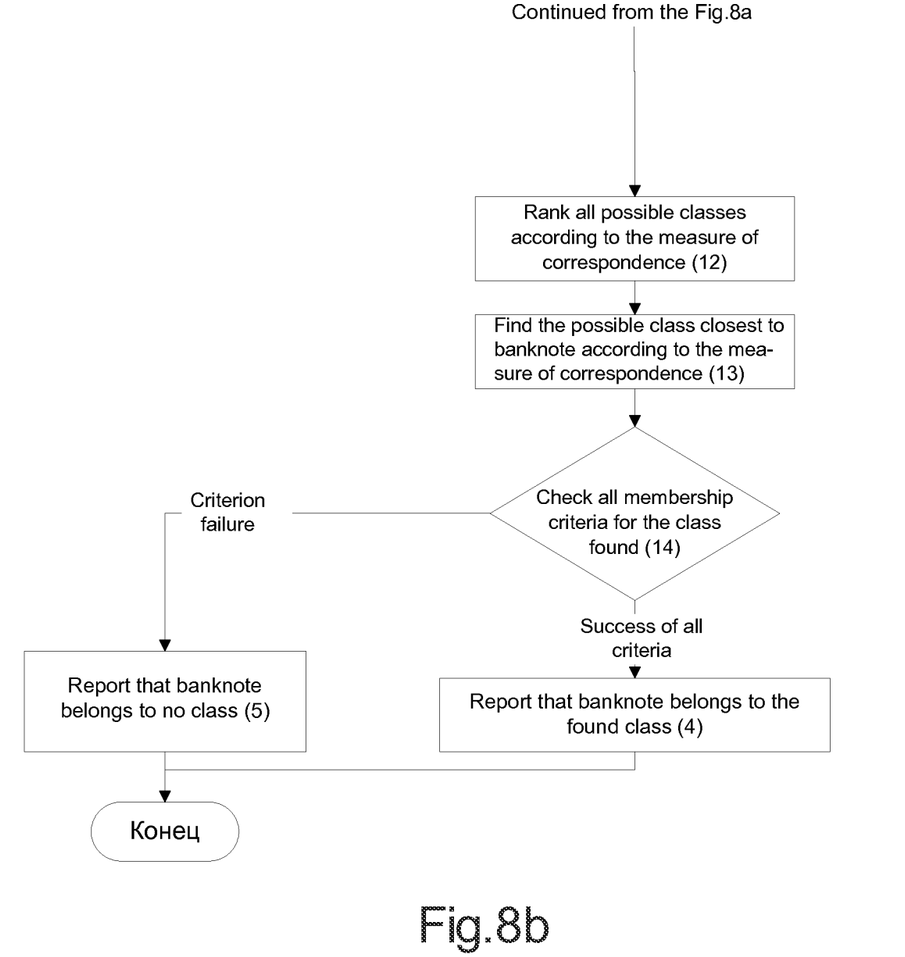

To reduce computational complexity during implementation of the method according to variant 2, classification may be supplemented by the banknote size checking in the way similar to variant 1. Such implementation is demonstrated in FIG. 8a and FIG. 8b. Extraction of the features (7) is followed by preliminary size classification (15). Only classes recognized as acceptable having size take part in further consideration (steps 16, 17, 9, 10, 11).

To reduce computational complexity even more, it is possible (for certain classes) to make a supplement to classification by checking the selection criteria (17). This checking is similar to checking of the criteria sequence demonstrated in FIG. 3. The selection criteria are checked so that to reduce the number of classes which require calculation of the measure of correspondence. The way the selection criteria are formed shall allow efficient rejection of the banknotes that do not belong to the class being checked. It may be implemented (for example) by checking the ratio of the banknote average transmission in two zones. Selection of the zones shall give a unique characteristic of the given class of banknotes. If due to the peculiarity of banknote features, one criterion is unable to ensure uniqueness; one more selection criterion may be added to the checking sequence. Advantage in computational complexity is achieved when the computational costs to check the selection criteria are on average less than the computational cost that would have been required to complete classification for the classes rejected by those criteria. Therefore, a large number of selection criteria may not accelerate but on the contrary make classification slower.

From step 9, processing is completely similar to the one demonstrated in FIG. 4.

INDUSTRIAL APPLICABILITY

The described example of the invention implementation does not cover all possibilities of its implementation and application. On the contrary, the scope of the invention covers not only all possible combinations of the technical solutions described here, but also possible supplements and changes within the limits of the claims.

We claim:

1. A method of banknote processing wherein a banknote is scanned to obtain its two-dimensional digital image; a banknote preliminary classification is made to reveal possible classes this banknote may belong to, a sequential checking of a banknote membership in the possible classes is made by a sequential checking of the banknote correspondence to each at least of two membership criteria;
    if the banknote does not match at least one criterion, a decision is taken to exclude this class from further consideration; a final result is assigned to a first detected class to which the banknote corresponds with all envisaged criteria of checking its membership in the given class;
    if there is not found any class to which the banknote corresponds according to all checked membership criteria, a decision is taken that the banknote does not belong to any of the possible classes that have been considered;
    wherein when the class membership is checked or confirmed, the areas in the obtained banknote image are allotted according to a scheme specified for this class;
    to check at least one criterion of the class membership, for a definite pair of areas, permissibility of an interrelation characteristic for this pair of areas is checked, and in this case, the interrelation characteristic of the areas is calculated as a function specified for the given pair and depending on the values of pixels in the areas constituting the pair; the interrelation characteristic is considered permissible only when a value of the indicated function falls within a specified range.

2. The method according to claim 1, wherein if it is found that the banknote does not belong to any of the discussed classes, an additional preliminary classification is made at least one time followed by checking of the banknote membership in possible classes;

each time there is used a new set of classes the banknote correspondence to which was not checked before, and the final result is assigned to the first detected class to which the banknote corresponds with all envisaged criteria for checking its membership in the given class;

if no class is found to which the banknote corresponds with all membership criteria envisaged for checking, a decision is taken that the banknote does not belong to any of the classes that have been considered.

3. A method of banknote processing wherein a banknote is scanned to obtain its two-dimensional digital image, a classification is conducted to reveal possible classes to which this banknote may belong to;

to do so, a measure of the banknote correspondence to this class is calculated for each revealed class, and the revealed classes are ranked in compliance with a value of measure of correspondence;

a class closest to the banknote according to the value of measure of correspondence is selected as a classification result;

basing on the classification results a banknote membership in the selected class is confirmed by checking its correspondence to at least one criterion specified for the class which is the classification result;

if the banknote does not correspond to the criterion, a conclusion is drawn that the banknote does not belong to this class, if the banknote corresponds to the criterion, a decision is that the banknote belongs to the class which is the classification result;

if during the membership confirmation no conclusion is drawn about the banknote membership in any class, a decision is taken that the banknote does not belong to any of the classes that have been considered;

wherein during checking or confirmation of the class membership, the areas in the obtained banknote image are allotted according to a scheme specified for this class;

to check at least one criterion of the class membership, for a definite pair of areas the permissibility of an interrelation characteristic for this pair of areas is checked, to do so, the interrelation characteristic of the areas is calculated as a function specified for the given pair and depending on the values of pixels in the areas constituting the pair, and it is considered permissible only when a value of the indicated function falls within a specified range.

4. The method according to claim 3, wherein if during confirmation of the banknote membership in the selected class, a conclusion is drawn that the banknote does not belong to the class that is the classification result, an additional check is carried out of membership in at least one additional class which, according to the ranking results, follows a class closest to the banknote according to the value of the measure of correspondence.

5. The method according to claim 3, wherein if during banknote classification, correspondence of the banknote to at least one additional criterion specified for each class is checked, and the classes that do not correspond to such a criterion are excluded from further consideration.

6. The method according to claim 4, wherein if during banknote classification, correspondence of the banknote to at least one additional criterion specified for each class is checked, and the classes that do not correspond to such a criterion are excluded from further consideration.

\* \* \* \* \*